Figure 1:
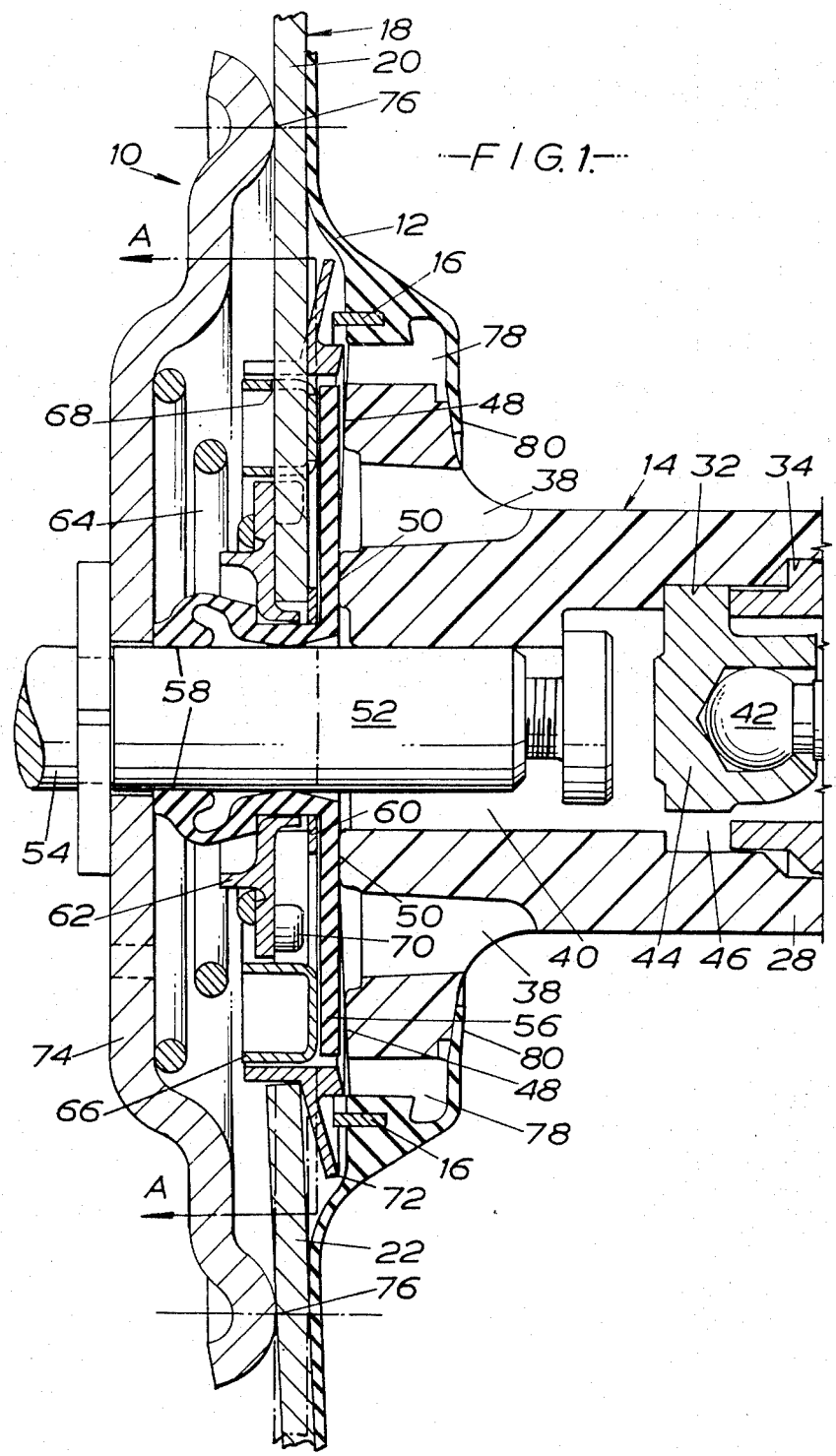

United States Patent [19]
Camm

[11] 3,756,124
[45] Sept. 4, 1973

[54] SERVO MOTORS FOR VEHICLE BRAKE SYSTEMS

[75] Inventor: John James Camm, Melbourne, Victoria, Australia

[73] Assignee: Girling Limited, Birmingham, England

[22] Filed: July 14, 1971

[21] Appl. No.: 162,445

[30] Foreign Application Priority Data
July 16, 1970  Great Britain.................. 34,431/70

[52] U.S. Cl. ................................ 91/369 B, 92/99
[51] Int. Cl. .............................................. F15b 9/10
[58] Field of Search ................ 91/369 A, 369 B, 91/369 R, 376; 92/99

[56] References Cited
UNITED STATES PATENTS
3,183,789  5/1965  Stelzer ........................... 91/369 B
3,246,578  4/1966  Randul ........................... 91/369 B
3,316,816  5/1967  Yardley ........................... 91/369 B
3,389,642  6/1968  Robinette ........................ 91/369 B Primary Examiner—Paul E. Maslousky
Attorney—Scrivener, Parker, Scrivener & Clarke

[57] ABSTRACT

The invention relates to servo motors for vehicle brake systems, and particularly relates to servo motors of the type having two contiguous fluid-tight compartments separated by a diaphragm supported on a deflecting plate comprising a plurality of circumferentially spaced fingers, and controlled by a pair of concentrically disposed valve seats. A deflecting plate for such a servo motor is disclosed, which comprises a plurality of spaced rigid fingers held in regular circularly spaced relationship of which some, but not all, are adapted to pivot alternatively about the concentric valve seats. By this means excessive hysteresis effects associated with this type of servo motor may be reduced.

9 Claims, 2 Drawing Figures

SERVO MOTORS FOR VEHICLE BRAKE SYSTEMS

This invention concerns servo motors for vehicle brake systems and relates more generally to a fluid flow control valve assembly for use especially in such servo motors.

In our British Patent No. 1,144,567 there is described a servo motor for a vehicle brake system of the kind which includes a pair of fluid pressure sources of different fluid pressures and which comprises an internally hollow housing, a movable wall within said housing and dividing the hollow interior thereof into contiguous first and second fluid chambers, a motor output member displaceable by said wall and extending externally of said housing, and fluid flow control valve means for selectively connecting the first chamber to said fluid pressure sources with the second chamber permanently connected to one of said sources only, thereby enabling a fluid pressure differential to be established between said chambers for moving said wall within said housing, said control valve means comprising a valve seat member formed with a pair of spaced passage means, a pair of relatively stationary concentric valve seats on said member and each circumscribing one of said passage means, and a common valve closure member engageable with and selectively tiltable about each seat to thereby open the passage means circumscribed by the other said seat, the end of one of said passage means remote from said valve seats being permanently connected to one of said fluid sources and the corresponding end of the other said passage means being permanently connected to said first chamber, and said movable wall comprising an annular elastic diaphragm whose outer periphery is rigidly fixed relative to the housing and a deflecting plate for operating the common valve closure member.

In that patent, the deflecting plate comprises a plurality of equally sized, radially extending fingers which are held in circularly spaced relationship and which are all selectively pivotable about each said valve seat to thereby achieve said tilting of the common valve closure member according to whether air is being admitted into one of the chambers to actuate the booster or air being withdrawn from said chamber to relieve the brakes. Because the valves are concentric, the pivot arm is shorter when the levers formed by said fingers pivot about the outer valve seat to open the atmosphere connecting than when they pivot about the inner valve seat to open the vacuum connection. As is explained further below, this gives rise to a "hysteresis" effect which results in the reaction force experienced by an operator on applying the brakes being greater than the reaction force experienced on releasing the brakes.

The present invention seeks to maintain a differential force requirement between the two alternative pivoting conditions, whilst ensuring that it does not exceed an acceptable amount.

According to one aspect of the present invention, the deflecting plate comprises a plurality of first, radially extending, rigid fingers held in circularly spaced relationship which are selectively pivotable about each said valve seat to thereby achieve said tilting of the common valve closure member and a plurality of second, radially extending, rigid fingers which are shorter than said first fingers and whose radially inner ends are located outwardly of the radially outer of said concentric valve seats.

According to a second aspect of the invention, there is provided a fluid flow control valve assembly which comprises a valve seat member formed with a pair of radially spaced passage means, a pair of relatively stationary and substantially concentric valve seats on said member, said valve seats each circumscribing one of said passage means, a common valve closure member engageable with and selectively pivotable about each seat to thereby open the passage means circumscribed by the other said seat, and deflecting means for operating the valve closure member, said deflecting means comprising a plurality of first, radially extending, rigid fingers held in circularly spaced relationship which are selectively pivotable about each said valve seat to thereby achieve said pivoting of the common valve closure member and a plurality of second, radially extending, rigid fingers which are shorter than said first fingers and whose radially inner ends are located outwardly of the radially outer of said concentric valve seats.

Figure 2:
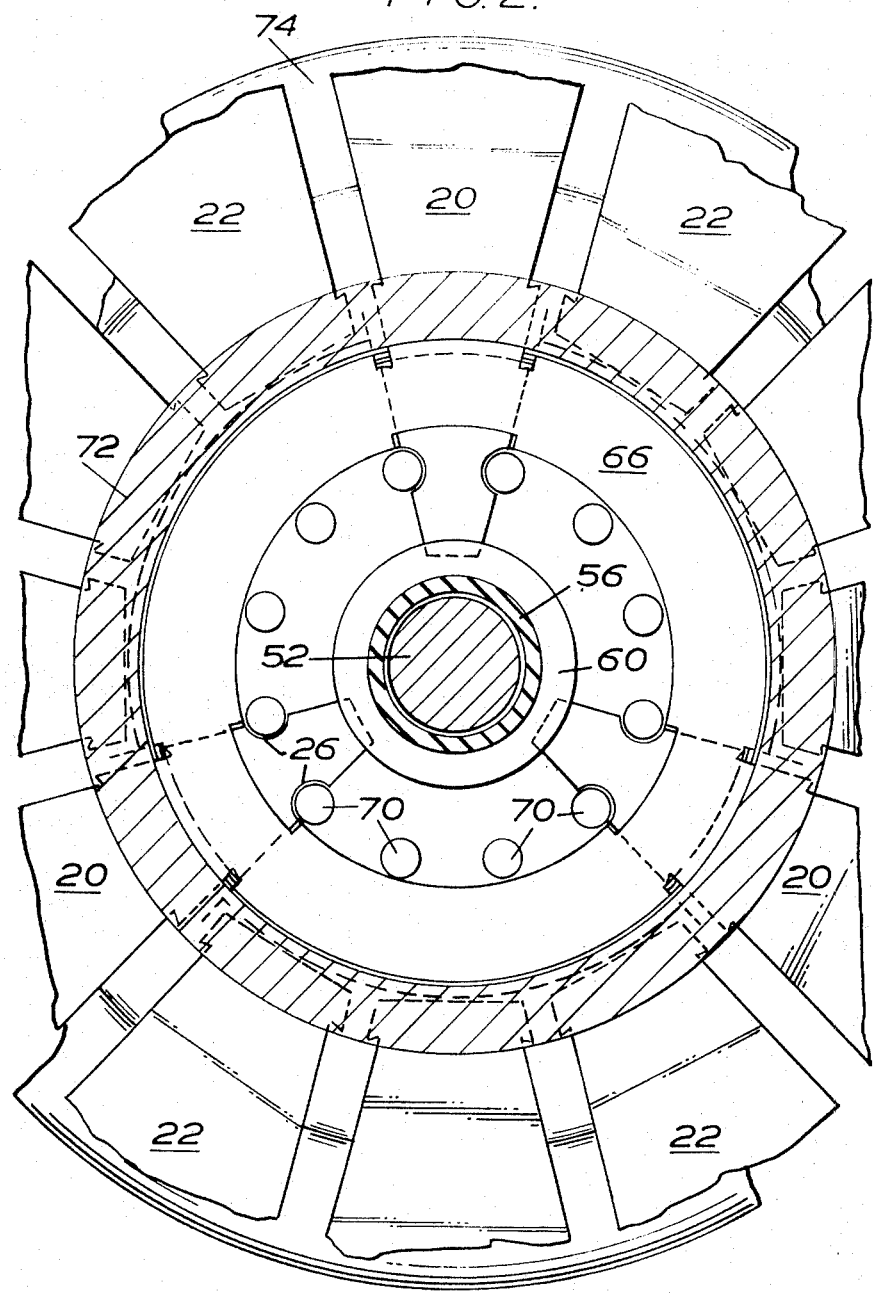

The invention will be described further, by way of example, with reference to the accompanying drawings, in which:

FIG. 1 is an axial cross section of part of a servo booster embodying the invention; and FIG. 2 is a section taken along the line A—A in FIG. 1.

The deflecting plate of the invention constitutes an improvement when used in the servo motor described in our British Patent specification No. 1144567, the entire disclosure of which is incorporated herein by way of reference. The accompanying drawings both show part of a servo booster modified according to the invention, the remainder of the servo booster being as illustrated and described in our above mentioned British specification No. 1144567.

Referring now to the drawings, a brake booster generally designated 10 comprises a diaphragm 12 fixed to a valve seat member 14 by means of an annular "garter" retainer 16. A deflecting plate 18 (more clearly shown in FIG. 2) is located adjacent to, and supports the diaphragm 12. The deflecting plate 18 comprises three rigid fingers 20 circumferentially and uniformly spaced between nine shorter rigid fingers 22. The fingers 20, 22 are held in pockets formed between annular sheets 74 of plastics material placed one upon the other only one such sheet 74 being visible in FIG. 2. The fingers 20 are formed with opposed pairs of substantially semi-circular depressions 26 towards their radially inner ends.

The valve seat member 14 has a hollow stem 28, stepped counterbores 30, 32, and 34, and passages 38 and 40, as conventionally known. A conventional input push rod 42 locates in a socket portion 44 which is butted against the shoulder defined between the counterbores 30 and 32. An air passage 46 communicates with passage 40 and atmosphere via a filter (not shown) which is situated coaxially of the push rod 42.

Annular valve seats 48 and 50 are located on the valve seat member 14 coaxially with each other and with the head 52 of an extension 54 of the output rod (not shown) of the servo. A resilient valve closure member 56 is located between the valve seat member 14 and the deflecting plate 18 adjacent valve seats 48, 50. The closure member 56 is sealed to the head 52 at 58. An annular plate 60 circumscribes the head 52 and provides a means of distributing the weight transmitted by fingers 20, which abut the annular plate 60. An annular support member 62 circumscribes the head 52, abuts the ends of finger members 20 and supports a spring 64 which biases the member 62, and therefore the ends of fingers 20, towards the closure member tending to maintain the closure member in contact with valve seat 50. A further annular member 66, concentric with and radially outward of the annular member 62, and U-shaped in transverse section, is provided with slots 68 through which fingers 20 pass. Slots 68 help locate the fingers 20 and the channel-shaped member 66 spreads reaction forces from the fingers 20 round the outer periphery of the closure member 56. The member 62 carries a number of circumferentially spaced axially extending pegs 70 which locate in the depressions 26 at the ends of fingers 20. The pegs 70 therefore locate fingers 20 in circumferential and radial directions.

An annular support member 72 is provided radially outwardly of the member 66 and circumscribes both members 66 and 62. The shortened fingers 22 abut the support member 72 which in turn abuts the valve seat member 14 at its outer periphery. A conventional dished fulcrum plate 74 provides an annular pivot point at 76 for fingers 20, 22 of the deflecting plate 18.

The valve seat member 14 is provided with a number of circumferentially spaced passages 78 which are sealed off by a flap portion 80 of diaphragm 12.

The arrangement shown in the drawings is in the off or "vacuum suspended" state. That is, the movable components are in their extreme right-hand position with respect to the servo body (not shown) and the valve closure member 56 abuts the valve seat 50 thus sealing off air passage 40 but is clear of valve seat 48. Thus, a state of vacuum exists on both sides of the diaphragm 12 as the left-hand side of the diaphragm is permanently connected to a source of vacuum (normally from the inlet manifold of the vehicle's engine). This is known as the "vacuum suspended" condition.

In operation, the input push rod 42 is moved to the left, when the socket 44 which abuts the shoulder formed between counterbores 30, 32 will cause the valve seat body 14 to move to the left. The long fingers 20 of the deflecting plate 18 pivot about the valve seat 50 until closure member 56 engages the valve seat 48, when the long fingers 20 pivot about valve seat 48 thus lifting closure member 56 clear of valve seat 50. This has the effect of, firstly, sealing off the volume to the left of the diaphragm from the volume to the right of the diaphragm when the valve seat 48 is contacted and, secondly, of allowing atmospheric air to reach the volume to the right of the diaphragm when the closure member 56 is clear of valve seat 50, air travelling from atmosphere through passages 46 and 40 rowards the valve seat 50 and thence through passage 38 to the volume on the right-hand side of the diaphragm 12. During this operation, the short fingers 22 pivot about their ends which abut the annular support member 72. If the input push rod 42 is now held in a steady position, air continues to flow through the various passages into the volume to the right-hand side of the diaphragm, thus pushing the diaphragm/deflecting plate/fulcrum plate assembly slightly further to the left and also causing the long fingers of the deflecting plate to pivot about valve seat 48 until the closure member 56 engages valve seat 50 once again, when the supply of air will be shut off. In this position, with both valves 48 and 50 contacted by closure member 56 the air pressure to the right of the diaphragm 12 just balances the reaction forces transmitted by output rod extension 54 and the servo unit is in a balanced state. If the input force is then discontinued, the reaction through extension rod 54 will cause the assembly to move to the right and the long fingers 20 will pivot about valve seat 50 thus causing closure member 56 to lift clear of valve seat 48. In this condition both sides of the diaphragm 12 are connected to the source of vacuum and a return spring (not shown) biases the fulcrum plate 74 to the right until the servo unit is in its "off" state.

To provide "feel" for the operator of the system a certain amount of the force developed by the servo unit should be fed back via the input push rod 42 as a reaction force. This is achieved by ensuring that the centre of pressure (or, more correctly, the annulus of pressure) of the air pressure acting on the right-hand side of diaphragm 12 falls radially outwardly of the annular pivot 76 of the fulcrum plate 74. Thus when the servo is "on," the fingers 20, 22 of the deflecting plate 18 tend to pivot around about point 76 of the fulcrum plate 74 and a reaction force is fed back via fingers 20 through the annular ring 60 and closure member 56 to the valve seat body 14 and thus via socket member 44 to the input rod 42. The short fingers 22 also pivot about the point 76 and transfer reaction via the support member 72 directly to the valve seat member 14 and then to push rod 42 as before.

Hysteresis effect is shown by the long fingers 20 for the following reasons. When the input force is being applied by push rod 42 the long fingers 20 pivot about the radially outer valve seat 48, whereas when the input force is released and the diaphragm assembly is moving to the right, the fingers 20 pivot about the radially inner valve seat 50. So far as concerns the reaction force reaching the valve seat member 14 due to the effect described in the previous paragraph, the fingers 20 may be considered as simple levers acting about the fulcrum 76. If the air pressure is assumed to be constant, then the moment about the fulcrum 76 is determined by the force $p$ acting at the centre of pressure multiplied by the distance $l$ between the fulcrum point 76 and the centre of pressure. This moment $pl$ must be balanced by the product of the reaction force experienced by the valve seat member 14 and the distance between the point of contact with valve seat member and the fulcrum 76. Now, as the point of contact on application of the brakes is the radially outer valve seat member 48 whereas on releasing the brakes the point of contact is the radially inner valve seat member 50, the reaction force experienced on applying the brakes will be greater than the reaction force experienced on releasing the brakes because the moment arm being less, the reaction force must be greater to balance the constant moment $pl$. Another way of stating this is that for a given input force the output force will depend upon whether the servo is being applied or is being released, i.e. the hysteresis effect described above. However, in the arrangement provided by the invention, only three of the fingers pivot about the valve seats whereas the remaining nine fingers pivot about support member 72 which remains at constant radius. Therefore, it will be seen that theoretically the hysteresis effect is reduced by 75 per cent. It has been found in practice that the hysteresis effect is reduced by slightly more than 70 per cent. It has also been found, however, that a small amount of hysteresis is beneficial as it tends to prevent "flutter" in the valve closure member.

The function of the flap 80 of the diaphragm 12, and passages 78, is as follows. If the brakes of a vehicle are repeatedly applied with the engine switched off, the volume to the left of the diaphragm will reach air pressure as the vacuum cannot be maintained in the absence of suction from the engine. A subsequent application of the brakes would cause the air pressure present on the left hand side of the diaphragm to actively oppose the application of the brakes. If more pressure were then applied via the input rod it is quite possible that the diaphragm could be torn free of the valve seat member 14 by the pressures involved. Consequently the air passages 78 together with the flap members 80 provide a safety valve should the air pressure on the left hand side of the diaphragm become greater than that on the right-hand side.

I claim:

1. A servo motor for a vehicle braking system of the kind including a pair of fluid pressure sources of different fluid pressures, comprising an internally hollow housing, a movable wall within said housing and dividing the hollow interior thereof into contiguous first and second fluid chambers, a motor output member displaceable by said wall and extending externally of said housing, and fluid flow control valve means for selectively connecting the first chamber to said fluid pressure sources with the second chamber permanently connected to one of said sources only, thereby enabling a fluid pressure differential to be established between said chambers for moving said wall within said housing, said control valve means comprising a valve seat member formed with a pair of spaced passage means, a pair of relatively stationary concentric valve seats on said member and each circumscribing one of said passage means, and a common valve closure member engageable with and selectively tiltable about each seat to thereby open the passage means circumscribed by the other said seat, the end of one of said passage means remote from said valve seats being permanently connected to one of said fluid sources and the corresponding end of the other said passage means being permanently connected to said first chamber, and said movable wall comprising an annular elastic diaphragm whose outer periphery is rigidly fixed relative to the housing and a deflecting plate for operating the common valve closure member, the deflecting plate comprising a plurality of first, radially extending, rigid fingers held in circularly spaced relationship which are selectively pivotable about each said valve seat to thereby achieve said tilting of the common valve closure member and a plurality of second, radially extending, rigid fingers which are shorter than said first fingers and whose radially inner ends are located outwardly of the reaidlly outer of said concentric valve seats.

2. A servo motor according to claim 1 in which the first and second fingers are supported in regularly circularly spaced relationship by retaining means.

3. A servo motor according to claim 2 in which the fingers are radially outwardly divergent in shape.

4. A servo motor according to claim 3 in which the radially inner ends of said second fingers abut a first annular member located radially outward of the periphery of the common valve closure member.

5. A servo motor according to claim 4 in which said first annular member also abuts said valve seat member for transmitting reaction forces from said second fingers to said valve seat member.

6. A servo motor according to claim 5 in which the radially inner ends of said first fingers engage a second annular member located concentrically radially inwardly of said first annular member and abutting said common valve closure member.

7. A servo motor according to claim 6 in which said rataining means for the fingers comprises a plurality of pockets formed between two sheets of plastic material, each pocket receiving a respective one of said fingers.

8. A servo motor according to claim 7 in which there are three of said first fingers and nine of said second fingers.

9. A servo motor for a vehicle braking system of the kind including a pair of fluid pressure sources of different fluid pressures, comprising an internally hollow housing, a movable wall within said housing and dividing the hollow interior thereof into contiguous first and second fluid chambers, a motor output member displaceable by said wall and extending externally of said housing, fluid flow valve means for selectively connecting the first chamber to said fluid pressure sources with the second chamber permanently connected to one of said sources only, thereby enabling a fluid pressure differential to be established between said chambers for moving said wall within said housing, a motor input member, and control means for controlling said valve means in response to actuation of said input member, said movable wall comprising an annular elastic diaphragm whoe outer periphery is rigidly fixed relative to the housing and which is supported by a deflecting plate comprising a plurality of radially extending, rigid fingers held in circularly spaced relationship by a retaining means, some of said fingers being of different length than the remainder of said fingers.

* * * * *